United States Patent [19]

Bachmann

[11] E Patent Number: Re. 33,421

[45] Reissued Date of Patent: Nov. 6, 1990

[54] TANK CONSTRUCTION WITH DOUBLE BOTTOM, AND METHOD OF ITS MANUFACTURE

[75] Inventor: Werner Bachmann, Mutschellen, Switzerland

[73] Assignee: Adisa Entwicklungs AG, Urdorf, Switzerland

[21] Appl. No.: 251,547

[22] Filed: Sep. 29, 1988

Related U.S. Patent Documents

Reissue of:

[64] Patent No.: 4,739,895
Issued: Apr. 26, 1988
Appl. No.: 898,365
Filed: Aug. 20, 1986

[30] Foreign Application Priority Data

Apr. 7, 1986 [CH] Switzerland ..... 1354/86

[51] Int. Cl.[5] ..... B65D 25/14

[52] U.S. Cl. ..... 220/5 A; 220/1 B; 220/457; 220/461; 220/68; 220/470

[58] Field of Search ..... 220/68, 5 A, 1 B, 457, 220/461, 470; 405/53

[56] References Cited

U.S. PATENT DOCUMENTS

| | | | |
|---|---|---|---|
| 3,341,051 | 9/1967 | Forman et al. | 220/450 |
| 3,380,623 | 4/1968 | Langen et al. | 220/461 X |
| 3,467,319 | 9/1969 | Rampe | 220/457 X |
| 3,475,260 | 10/1969 | Stokes | 220/453 X |
| 3,519,164 | 7/1970 | Lehto | 220/453 |
| 3,669,816 | 6/1972 | Smith et al. | 220/83 X |
| 4,004,706 | 1/1977 | Guldenfels et al. | 220/83 X |
| 4,068,777 | 1/1978 | Humphrey et al. | 220/1 B |
| 4,552,166 | 11/1985 | Chadbourne, Sr. et al. | 220/461 X |
| 4,552,281 | 11/1985 | Schneider | 220/457 X |
| 4,613,922 | 9/1986 | Bachmann | 405/53 X |

*Primary Examiner*—Steven M. Pollard
*Attorney, Agent, or Firm*—Frishauf, Holtz, Goodman & Woodward

[57] ABSTRACT

To form a substance supported inner wall of a double-wall bottom and portion of the side wall of a tank, the inner wall is formed by a ridged, ribbed, puckered or embossed aluminum foil of, for example, 0.15 mm to 0.3 mm, preferably about 0.2 mm thickness, with protrusions or projections extending towards the outer or bottom wall. Since such foils are not available in sizes sufficient to lay out an entire tank in one unit, a plurality of foil units are placed adjacent each other, preferably with edge zones overlapped, and the overlap is bridged and connected by a fiber reinforced ribbon or tape, preferably glass fiber, the thus formed bottom wall being coated with an epoxy resin in which the glass fiber reinforced ribbon or tape is embedded. The tensile strength at the junctions is higher than the tensile strength of the foil units themselves, the plastic coating being present merely to embed the ribbon or tape fibers, retain it in position, and additionally provide a protective layer to protect the aluminum against attack from contents of the tank, but contributing little to the holding strength of the inner or top layer of the bottom wall, since the plastic layer then need be of only up to about 1 mm thickness.

22 Claims, 1 Drawing Sheet

Fig. 1
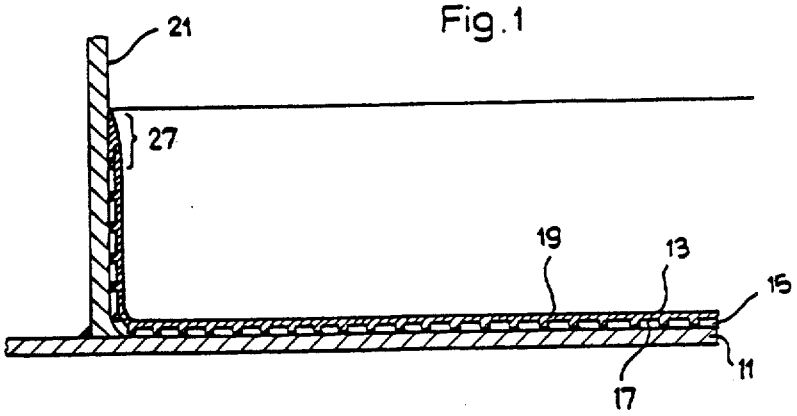
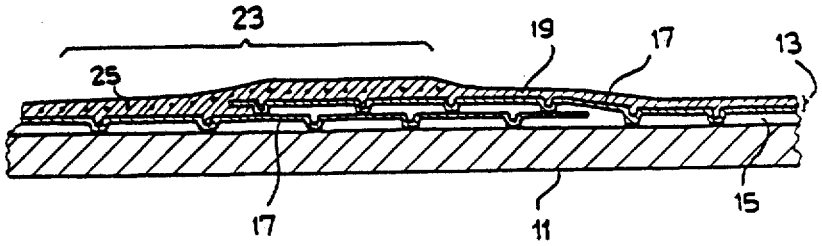
Fig. 2

TANK CONSTRUCTION WITH DOUBLE BOTTOM, AND METHOD OF ITS MANUFACTURE

Matter enclosed in heavy brackets [ ] appears in the original patent but forms no part of this reissue specification; matter printed in italics indicates the additions made by reissue.

REFERENCE TO RELATED PUBLICATIONS

Swiss Pat. Nos. 440,134, 466,498 (addition to 440,134), 4,820,243, 517,630, 618,658, 471,728.

The present invention relates to tanks, and more particularly to an upright tank construction having a double bottom to define a chamber between a lower bottom plate and an upper bottom plate or layer, which can be used for testing for leaks, and to a method of its manufacture.

BACKGROUND

Swiss Pat. No. 440,134 describes a double-wall tank having an inner wall, for example made of steel, and an outer wall made of plastic. A spacer structure in form of a wire grid or wire mesh or wire weave is located between the inner wall and the outer wall. The wire mesh or grid forms a substrate for a foil forming the outer wall, located on the wire grid or wire weave. The foil described may be a cellulose foil of about 0.06 mm thickness, or an aluminum foil of about 0.1 mm thickness. The foils are used as substrates for a relatively thick layer made of glass fiber reinforced plastic, thereby forming a double-wall tank. The double wall is used to increase the safety and reliability of the tank with respect to leaks of liquid retained in the tank. A leakage warning apparatus is provided which indicates a leak at the inner wall.

The construction is difficult to make since the wire mesh as well as the foil must be handled and placed. The foil, effectively, adds only little to the strength of the wall. The wall, thus, must be made of a relatively thick plastic layer which, additionally, is reinforced with fibers, typically glass fibers. This plastic layer requires much material, and the construction thereof is relatively complex since it is applied by spraying. The spray apparatus must include a glass fiber cutter. It is unavoidable that glass fibers become loose and fly about. The glass fibers easily penetrate the skin of operators and result in itching. Loose glass fibers, additionally, interfere with working within the tank, and, in some cases, make working within the tank completely impossible.

The Swiss Pat. No. 440,134 describes such a tank in which only the outer wall is made of such plastic material. The outer wall must be carefully made to avoid the inclusion of air bubbles, requiring rolling out of the applied plastic material to eliminate the formation of any such air bubbles. Air bubbles may, otherwise, be introduced upon spraying of the plastic material together with the glass fibers. The rolling-out of the fiber-reinforced plastic wall is time-consuming, and hence expensive.

Swiss Patent of Addition No. 466,498, forming an addition to the previously discussed main patent. Swiss No. 440,134, discloses use of a plastic grid or mesh instead of a wire grid or mesh. The plastic grid has the advantage that it is substantially more flexible than metal, and is also somewhat stretchable, so that its application is simplified. In all other respects, however, the difficulties of manufacture which arise in the construction explained in connection with the main patent still pertain.

Swiss Pat. No. 471,728 describes a double-wall tank having an inner wall made of steel and an outer wall made of plastic. A spacer in the form of a foil is described, the spacer being formed with impressed or punched bumps or warts, which are facing the inner wall and are supported against the inner wall. The description proposes a spacer wall of about 0.2 mm sheet steel or sheet aluminum.

The arrangement has an advantage over the tank in accordance with the previously discussed Swiss Pat. No. 440,134 since this very thin foil can be placed about the surface of the inner wall more easily than the wire mesh which, when using a wire diameter sufficient to form a suitable chamber or hollow space between the tank walls, is comparatively stiff. All other disadvantages of the tank described in connection with Swiss Pat. No. 440,134, however, still pertain. The description is directed to the manufacture of an outer wall made of plastic, but not to an inner wall made of plastic.

Swiss Pat. No. 480,243 describes an inner jacket for a storage container which is liquid-tight. An embossed foil is located in the region of the vertical side walls. The bottom of the tank utilizes as an intermediate layer a porous mass, for example porous concrete.

Swiss Pat. No. 517,630 describes a tank to retain liquid having non-metallic walls. This liquid-containing tank has electrical conductors located on one of the wall surfaces so that the freedom from pores of the double walls of the tank can be tested; any pores which might occur can be localized by means of a spark inductor. The outer wall of the container, preferably, is made of concrete.

The conductive material is, preferably, an aluminum foil formed with bumps or warts or longitudinal ribs or ridges, for example in the form of creases. The aluminum foil may have from between 0.02 to 0.1 mm thickness. The bumps, warts, or ribs or ridges, for example longitudinal creases, form a test space for leakage between an outer wall and an inner wall. The inner wall is formed by a glass fiber reinforced plastic, for example polyester, polyurethane, or a thermoplastic material which has the required stability, pressure resistance and corrosion resistance with respect to the liquid to be introduced into the tank. The relatively thick and stiff plastic layer, and not the metallic layer, provides the necessary strength for the inner wall.

Swiss Pat. No. 618,658 describes a similar construction which is directed also to form a double bottom of an upright tank. Rather than using an aluminum foil with bumps or longitudinal creases, the description states that strong paper, such as Kraft paper or the like, or heavy wrapping paper may be used, formed with projections and recesses.

The paper is made by first applying a coating ink thereon which includes glass fibers having a fiber length of between 2.5 mm to 5 mm. The first layer applied is dried for 24 hours and then a second, usually colorless layer is applied. The strength of the inner wall is primarily governed by the layer reinforced with glass fibers; the heavy paper, formed with projections and depressions, hardly contributes anything to the strength. It is clear that, for such a construction, the plastic layer must be relatively thick. Consequently, the manufacture is time-consuming, particularly since after application of the first layer, a period 24 hours must be permitted to elapse. The use of plastic to manufacture a thick plastic layer is extensive.

THE INVENTION

It is an object to provide a tank construction, and more particularly a construction for an upright tank which has a double bottom, which can be easily made in a short period of time and utilizes a minimum of material, especially plastics.

Briefly, the double bottom is formed by a bottom layer and a top layer, in which the top layer is constructed of a plurality of foil or sheet elements, each of a material having a strength characteristic of and a thickness requisite for the top layer of the double bottom, that is, to support the contents of the tank above the chamber defined by the two layers. The plurality of foil or sheet elements are located next to each other, preferably with overlap. The foil or sheet elements are formed with projections extending from a major surface of the foil or sheet element towards the bottom of the layer to have a puckered configuration. A fiber reinforced resin layer is applied and bridges over the terminal edges of adjacent foil or sheet elements. The foil or sheet elements, with the puckered surface facing downwardly towards the bottom of the tank then is covered-over in its entirety by a protective plastic layer cover. This protective layer cover will extend over the foil and sheet elements as well as over the fiber reinforced resin layer bridging the respective foil or sheet elements and connecting them together. It is of a thickness just sufficient for protection of the foil or sheet layer elements against attack from the contents of the tank without, however, substantially contributing to the strength of the top layer. Thus, the material of the protective layer prevents, for example, chemical attack on the puckered or embossed foil and fiber reinforced bridging elements which join the respective foil units to form a complete tank bottom.

In contrast to the prior art structures, the embossed or puckered foil does not form a support layer for a plastic layer which then is of a thickness and strength to support the contends of a tank; rather, the embossed or puckered foil itself provides for the necessary strength of the upper wall element of the double-wall bottom, the plastic layer providing, essentially, only protection against attack by the contents of the tank on the upper surface of the embossed or puckered layer.

The upper wall of the tank is built of a plurality of foil elements; this substantially simplifies the manufacture. It is important, hence, that the foils will not be pulled away at their junctions. This can easily be obtained by providing a fiber reinforced plastic layer at the functions. In accordance with a preferred feature of the invention, the entire region of the edges of the foil elements are covered-over with a glass fiber reinforced plastic ribbon or tape. Such a ribbon or tape is highly resistant to tearing. The junction regions of the foil elements may have an even higher tearing strength and tearing resistance than the foil element as such, covered only with a protective plastic layer. In spite of this glass fiber reinforced tape, however, the entire upper wall of the tank remains relatively elastic and somewhat flexible, so that relative movement, for example due to changes in temperature, between the lower and the upper wall of the tank will not lead to breakage in the upper tank wall. Danger of rupture of the upper tank wall, thus, is essentially prevented.

In accordance with a preferred feature of the invention, the respective puckered or embossed foils are so placed that they overlap at their edges, although this is not strictly necessary for all constructions. Overlapping the edges or edge zones facilitates manufacture of the bottom since fitting work is reduced to a minimum. The extent of overlap of the foils is not critical; thus, cutting accuracy of the foil units is not a major problem and hence the foil units can be made fast and inexpensively.

In accordance with another preferred feature, the embossed foils are prime-coated at least on one side and, especially on the side which will have the glass fiber reinforced tape or band or ribbon applied, and thereafter the plastic layer applied thereover. Priming the surface substantially improves adhesion of the protective plastic layer.

The embossed or puckered foil forming the top layer preferably is an aluminum foil having a thickness of between 0.15 mm to 0.3 mm. Foil units of such thickness are relatively light and can easily be bent. This facilitates handling and cutting when making the double bottom. An aluminum embossed foil of a thickness of about 0.2 mm has been found particularly suitable. Such a foil has the usually desired strength, and can easily be handled, cut and shaped.

The protective layer of plastic material is preferably a resin, such as an epoxy resin. The thickness need only be about 1 mm. This has the advantage that it can easily be applied in a short period of time and the overall requirement for plastic resin material remains low.

In accordance with a feature of the invention, the method of making the tank includes the step of laying out the foil units on the tank bottom, precoating the edge regions with plastic resin, and placing on the still plastic resin a glass fiber reinforced tape; this tape is then rolled out and the entire assembly is coated with a plastic resin coating layer. In accordance with a preferred feature of the invention, the plastic resin is applied by an air-free spray process. Such a process is particularly suitable for working within the interior of a tank.

DRAWINGS

FIG. 1 is a schematic longitudinal cross-sectional fragmentary view through the bottom of an upright tank; and FIG. 2 is a greatly enlarged detail fragmentary view of the bottom wall structure of the tank generally shown in FIG. 1.

DETAILED DESCRIPTION

The tank shown in FIGS. 1 and 2 has a bottom wall formed by a lower tank wall structure 11 and an upper tank wall 13. A space or chamber 15 is formed between the upper and lower walls 13, 11 to form a test chamber, so that leakage of fluid from within the inner wall 13 of the tank can be checked. The upper tank wall 13 includes a foil element 17 which is formed with projections, in short an embossed or puckered foil 17. Preferably, the foil 17 is an aluminum foil. The upper tank wall 13, additionally, includes a plastic layer 19, preferably an epoxy layer, applied over the foil 13. The thicknesses of the respective foils are shown to scale in the drawing of FIG. 1, for simplicity. Layers 17, 19 preferably extend for at least a portion along the upper side walls 21 of the tank, as seen in FIG. 1.

In accordance with the invention, the embossed or puckered aluminum foil 17 itself has the strength necessary to form the upper wall of the bottom of the tank. For aluminum, a thickness of between 0.15 mm to 0.3 mm is sufficient, preferably about 0.2 mm. The plastic layer 19 merely forms a thin protective layer of, for example 1 mm thickness. The protective layer 19 protects the aluminum embossed sheet 17 against attack or other effects of fluid, for example liquid, located within the tank. The layer is just thick enough to provide a protective function—it does not, basically or substantially, contribute to the physical strength of the top wall of the tank bottom. Thus, no fiber reinforcement, and particularly glass fiber reinforcement, is needed.

Ridged, embossed or puckered aluminum foils, like the foil 17, are not commercially available in such sizes that an entire bottom of a large tank can be formed thereby. Rather, it is necessary to place a plurality of foil units, for example foil strips or foil webs next to each other. As shown in FIG. 2, the regions 23 at the edges of the foil units have a glass fiber ribbon, for example a woven ribbon 25 inserted in the plastic layer 19. Glass fiber textile ribbons and tapes are highly resistant against tearing. The tear resistance of the upper wall 13, in the region 23 (FIG. 2) will be higher than in the region other than the region 23. A suitable tape or ribbon is a glass filament ribbon of 200 g/m$^2$, in a linen weave. Such a glass fiber ribbon 15—FIG. 2—can also be used in the zone 27, that is, in the region of the junction of the upper wall 13 with the side wall 21 of the tank.

METHOD OF MANUFACTURE

The bottom wall 11 of the tank, preferably with a protective coating of plastic applied thereto, has embossed foil strips 17 placed thereon. The respective strips or webs 17 are so placed that they overlap. This is not necessary, but a preferred form. The region of the edge surfaces of the foil strips 17—the region in FIG. 2—is pre-coated with a plastic resin, for example epoxy resin. While the epoxy resin is still in liquid state, the glass fiber strip or tape 25 is applied and rolled into the plastic, applied during the pre-coating step. In a similar manner, a glass fiber tape can be introduced into the region 27. The glass fiber tape there, also, is rolled in. This closes off the chamber 15 towards the outside, thus forming a tight leakage test chamber. The entire surface which has the foil units or foil elements 17 thereon, pre-coated with epoxy resin and the reinforcement strip applied, is then coated with the same plastic resin to form the completely coated layer 19.

After curing or hardening, a test for freedom from pores utilizing a spark detector can be made. The plastic layer 19, preferably, is applied by an air-free spray process.

As can be readily seen, the upper wall 13—or, at the side, the iner wall 13—required only little time for its application and only a small quantity of plastic material. The upper wall 13 is relatively thin and, hence, has a degree of flexibility, so that the danger of leakage is very low. The upper wall, likewise, can match dimensional changes of the tank wall 11, 21, that is, of the main tank wall and particularly of the lower tank wall 11, without stressing the material of the upper wall substantially. Thus, the double-wall construction is particularly durable and reliable against leakage.

The construction and method is particularly suitable for tanks having a diameter of, for example, from 2 meters to 70 meters, or any desired size, for example for use to retain petroleum products, especially in the petrochemical industry.

I claim:

1. [Upright tank] *Tank* construction having a double bottom, including a bottom (11) and a composite top layer (13), the composite top layer being spaced from the bottom and defining a leakage test chamber between the top layer and the bottom, and in which the top layer (13) is formed by a foil or sheet element having projections extending from the major surface of the foil or sheet element towards the bottom [layer ](11), whereby the foil or sheet element will have a puckered or ribbed surface configuration at its underside, and a plastic protective layre (19) covering the surface of the foil or sheet element remote from the bottom surface.

wherein the composite top layer (13) comprises a plurality of metal foil or sheet elements (17), each smaller than said bottom (11), said foil or sheet elements being of a material having a thickness and strength characteristic requisite for the top layer of the double bottom and for supporting the contents of the tank above the chamber between said bottom, and top layer said foil or sheet elements defining terminal edges, said terminal edges being placed close to each other;

fiber reinforced layers (25) bridging over terminal edges and over an adjacent portion of an adjacent foil or sheet element, and a sprayed plastic layer (19) embedding said fiber reinforced layer (25) adhering to and covering over both all the foil or sheet elements and the fiber reinforced layers (25) and forming a continuous protective layer, said protective plastic layer being of a thickness sufficient for protection of the respective individual foil or sheet elements (17) and the resin layers (25) against attack from the contents of the tank without substantially contributing to the strength of the top layer.

2. The construction of claim 1, wherein the terminal edges of the foil or sheet elements (17) are located adjacent edge regions or edge zones;

and wherein the fiber reinforced layer (25) covers the edge zones and extends over the adjacent edge zones of the foil or sheet elements.

3. The construction of claim 1, wherein the terminal edges of the foil or sheet elements are located in overlapping relationship, and define, therewith, overlapping end zones or regions;

and wherein the fiber reinforced layer (25) covers the overlapping regions and extends beyond the overlap of at least one of the respective edges.

4. The construction of claim 1, wherein the fiber reinforced layer (25) is formed by a glass fiber ribbon or tape embedded in said sprayed-on plastic layer (19).

5. The construction of claim 1, wherein the foil or sheet elements are prime-coated on at least one surface thereof.

6. The construction of claim 1, wherein the foil or sheet elements are prime-coated on both surfaces thereof.

7. The construction of claim 1, wherein the foil or sheet elements comprise aluminum foils having a thickness on regions remote from the projections or ribs of between 0.15 mm to 0.3 mm.

8. The construction of claim 7, wherein said thickness is in the order of about 0.2 mm.

9. The construction of claim 1, wherein the protective plastic layer (19) has a thickness of up to about 1 mm.

10. The construction of claim 9, wherein said protective plastic layer (19) comprises an epoxy layer.

11. The construction of claim 1, wherein said protective plastic layer (19) comprises a layer of epoxy;

and said fiber reinforced layer (25) comprises a tape or ribbon of glass fiber material embedded in the epoxy layer (19) in the region bridging over the terminal edges of adjacent foil or sheet units.

12. The construction of claim 1, wherein the edge regions or zones of adjacent foil or sheet units are placed in overlapping relation, and said fiber reinforced layer (25) comprises a tape or ribbon which overlaps and extends over at least a portion of the overlap of said foil or sheet units and a portion of the respective foil or sheet elements in a regions just beyond the overlap.

13. The construction of claim 12, *wherein* in the overlapping region of the foil or sheet elements (17), one element defines an upper overlapping end regions and the other element defines a lower overlapped end region;

and wherein said fiber tape or ribbon comprises glass fiber material and extends over the terminal edge of the overlapping upper element and over a neighboring portion of the overlapped lower element, 14. The construction of claim 1, wherein said foil or sheet elements extend along a side wall (21) of the tank to form an inner wall therefor;

further including a junction between the foil or sheet elements (17) of the inner wall and the side wall (21) of the tank, said junction comprising at least one foil or sheet element extending alongside the side wall (21) of the tank, and a fiber reinforced layer (25) extending over the terminal edge portion of the terminal foil or sheet element adjacent the side wall of the tank and an adjacent region of the side wall of the tank, said fiber reinforced layer comprising a tape or ribbon of fiber reinforced fabric overlapping the edge region of the terminal foil or sheet element (17) and extending over a portion of the side wall of the tank, said tape or ribbon being embedded in said protective plastic layer (19), said protective plastic layer forming a continuous layer and extending over at least a portion of the side wall of the tank to form a terminal connection (27) of the inner wall and the side wall of the tank.

15. Method to construct [an upright] *a* tank having the [upright] tank construction claimed in claim 1 comprising the steps of placing a plurality of foil or sheet elements on the bottom layer (11) of the tank, with the terminal edges adjacent each other and with the projections facing the bottom layer;

pre-coating the surface of the foil or sheet elements remote from said projections with a flowable plastic resin by spraying said plastic resin thereon;

placing a ribbon or tape of fiber reinforcement (25) on the still liquid plastic resin in the region of the edges, and overlapping and bridging over at least one portion of adjacent foil or sheet elements;

embedding the ribbon or tape in the still liquid resin; and spraying additional liquid resin over the embedded ribbon or tape and the foil or sheet elements to form said protective plastic layer.

16. The method of claim 15, wherein the step of placing the foil or sheet elements comprises placing the foil or sheet elements with the edge regions in overlapping relationship, and the step of placing the ribbon or tape comprises overlapping one free edge of the foil or sheet elements, the adjacent edge region, and the region beneath said adjacent edge region of the overlapped foil element.

17. The method of claim 15, wherein said step of embedding the tape or ribbon (25) comprises rolling-in the tape or ribbon into the still liquid resin pre-coating layer.

18. The method of claim 15, wherein the step of pre-coating the foil or sheet elements and the step of coating additional liquid resin comprises applying a resin by an air-free spray process.

19. The method of claim 15, including the step of placing at least one foil or sheet element against a side wall (21) of the tank;

and including the step of forming an end junction of the foil or sheet element with the side wall of the tank by embedding fiber reinforcement material in the edge region (27) of the terminal foil or sheet element and the adjacent portion of the side wall (21) of the tank, overlapping the edge of the terminal foil or sheet element and extending therebeyond and on the side wall (21) of the tank;

and carrying out said steps of pre-coating the foil or sheet elements and of coating additional liquid resin over the at least one foil or sheet element placed against the side wall of the tank, over said fiber reinforcement material and over an adjacent portion of the side wall of the tank for forming a continuous protective plastic layer with said fiber reinforcement material embedded therein.

20. The method of claim 15, wherein said steps of embedding the tape or ribbon (25) comprises rolling-in a tape or ribbon of fiberglass material into the still liquid resin pre-coating layer, and said steps of pre-coating the foil or sheet elements and of coating additional liquid resin over at least one foil or sheet element comprises spraying epoxy resin, respectively, over the surface of the foil or sheet elements remote from said projections and over the fiberglass ribbon or tape rolled-in said pre-coated surface and then spraying the additional epoxy resin over the foil or sheet elements and the embedded fiberglass ribbon or tape to form a continuous protective epoxy layer.

*21. The construction of claim 1 wherein said tank construction is an upright tank construction.*

*22. The method of claim 15, to construct an upright tank, having the upright tank construction claimed in claim 21.*

* * * * *